United States Patent Office 3,585,197
Patented June 15, 1971

3,585,197
1,2-DIHYDRO-1,3,5-TRIAZINE DERIVATIVES
Michael C. Seidel, Levittown, and Kenneth L. Viste, Warminster, Pa., assignors to Rohm and Haas Company, Philadelphia, Pa.
No Drawing. Continuation-in-part of application Ser. No. 785,366, Dec. 19, 1968. This application Apr. 22, 1970, Ser. No. 30,998
Int. Cl. C07d 55/18
U.S. Cl. 260—249.5                 11 Claims

ABSTRACT OF THE DISCLOSURE

Novel compounds belonging to the class of 1-alkyl-4-(mono or dialkylamino)-1,2-dihydro-1,3,5-triazin-2-one and 1 - alkyl - 4 - (mono or dialkylamino)-1,2-diyhdro-1,3,5-triazine-2-thione. These compounds are particularly useful for the control of plant growth.

---

This application is a continuation-in-part of U.S. Ser. No. 785,366, filed Dec. 19, 1968, now abandoned.

This invention is concerned with new and useful organic chemical compounds of the class of 1,2-dihydrotriazines and their use as herbicides. The invention also embodies various herbicidal formulations and compositions and their employment in the control of undesirable plant growth.

The novel compounds of this invention are 2-one or 2-thione derivatives of 1-alkyl-4-(mono or dialkylamino)-1,2-dihydro-1,3,5-triazines, and their acid addition salts. These may be depicted by the following structural formula

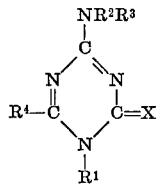

wherein $R^1$ is an alkyl group of 1 to 5 carbon atoms, $R^2$ is an alkyl group straight or branched of 2 to 14 carbon atoms, $R^3$ is hydrogen or is an alkyl group of 1 to 5 carbon atoms only when $R^2$ is t-butyl or t-amyl, $R^4$ is hydrogen, methyl or ethyl, and X is O or S.

The alkyl groups can be straight or branched chain. Typically the $R^2$ alkyl groups may be methyl, ethyl, propyl, isopropyl, butyl, sec-butyl, t-butyl, amyl, sec-amyl, t-amyl, hexyl, heptyl, octyl, t-octyl (i.e. 1,1,3,3-tetramethylbutyl), decyl and t-dodecyl with the tertiary alkyl groups being preferred. The compounds where $R^3$ and $R^4$ are hydrogen are preferred.

For convenience these compounds are sometimes referred to below as simply 1,2-dihydro-1,3,5-triazines.

The chemistry of symmetrical-triazines and the herbicidal properties of selected members of this class of compounds are widely known. Such herbicidal structures include 2-chloro-4,6-bis(ethylamino) - s - triazine (simazine), 2 - chloro - 4 - ethylamino-6-isopropylamino-s-triazine (atrazine), 2-methoxy-4,6-bis(isopropylamino)-s-triazine (prometone) and 2,4 - bis(isopropylamino)-6-methylmercapto-s-triazine (prometryne) for which see Herbicide Handbook of the Weed Society of America, first edition 1967, pages 21, 42, 56 and 191. The chemistry of the 1,2-dihydro-1,3,5-triazin-2-one and triazine-2-thione is much more obscure and their herbicidal properties have not been investigated. Such compounds having a 4-amino substituent and a 6-alkyl substituent have been reported by Ostragovich et al. (see Chemical Abstracts 6, 1137 (1912), 25, 705 (1931) and 30, 468 (1936)), by Dangyan and Titanyan (see Chemical Abstracts 54, 561 (1960)) and by Kreutzberger (see J. Am. Chem. Soc. 79, 2629 (1957)). These structures having 1-alkyl-4-amino-6-alkyl substituents have been studied by Piskala and Gut (see Chemical Abstracts 59, 7529 (1963)) and those with a 4-alkylamino substituent have been reported in German Pat. 1,065,687. The 1-alkyl-4-(mono and dialkylamino) and the 1-alkyl-4-(mono and dialkylamino)-6-alkyl derivatives of this invention have not heretofore been investigated.

One general method of preparation is the reaction of an alkyl guanidine with an alkyl isocyanate or isothiocyanate to produce the corresponding alkylcarbamoyl or alkylthiocarbamoyl guanidine and this is then condensed with an ortho ester to close the ring. The following reaction illustrates this procedure

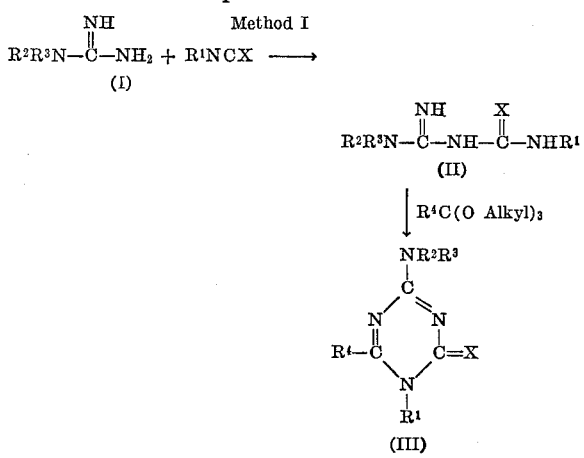

In these formulas $R^1$, $R^2$, $R^3$, $R^4$ and X have the meanings given above.

The starting alkyl guanidines of Formula I, often in salt form, may be made by known methods such as reaction of an isothiuronium salt with a primary amine ($R^2NH_2$) or secondary amine ($R^2R^3NH$) or by the method of U.S. Pat. 3,140,231 by reaction of the alkyl cyanamide ($R^2NHCN$) with ammonium chloride.

The reaction of the alkyl guanidine with the isocyanate or isothiocyanate ($R^1NCX$) is preferably carried out in the presence of a solvent such as ketones, e.g. acetone, dioxane and dimethyl sulfoxide. Often a salt, such as the hydrochloride, of the alkyl guanidine is used and this is neutralized with a base such as alkaline hydroxide or alkaline alkoxide to free the base, often just prior to reaction with $R^1NCX$. It is preferable that the resulting free guanidine base be at least partially soluble in the reaction solvent. The reaction of the guanidine with the $R^1NCX$ compound may conveniently be carried out in the temperature range of 20°–60° C., preferably 35°–45° C. In some instances a slight exotherm occurs and the temperature may be maintained by the regulated addition of one reactant to the other. The order of addition is not critical. The reaction is usually fairly rapid. The products are isolated by conventional means such as precipitation by drowning in water, filtration and recrystallization. A literature reference which describes the general method of preparation of carbamoyl derivatives of guanidines is F. H. S. Curd et al. J. Chem. Soc. 1949, 1732. A related reaction of amidines with isothiocyanates is described in A. Pinner "Die Imidäther und Ihre Derivate," Berlin 1892, page 169. Table I gives the characterization of compounds of Formula II.

The ring closure of the compounds of Formula II by means of ortho esters has been used for related dihydrotriazines. For example see Piskala and Gut, Chemical Abstracts 59, 7529c (1963). Shapiro et al., e.g. see J. Am.

Chem. Soc. 81, 2220 (1959), describe this method for the preparation of triazines from biguanides. For this reaction use of an excess of the ortho ester as a solvent is preferred. The reaction is often run at reflux temperature and because of the lower boiling point a methyl ortho ester is often preferred to an ethyl ortho ester. The reaction temperature is usually in the range of 40°–120° C., preferably 50°–100° C. The ring closure may be somewhat slow and often requires 20 hours or more. An acid catalyst facilitates the reaction. Typical acid catalysts are p-toluene sulfonic acid and a macroreticular sulfonic acid ion exchange resin. It is often convenient to remove the excess ortho ester under vacuum and to reuse it. The product thus obtained as a residue may be purified, if desired, by conventional means such as recrystallization.

An alternative reagent for cyclization which can be used is dimethylformamide dimethylacetal without solvent. In certain cases superior yields are obtained with this reagent.

In some instances the ring closure of the thiocarbamoyl guanidines of the formula

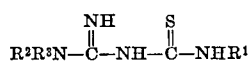

results in at least partial hydrolysis of the thione group and a 1,2-dihydro-1,3,5-triazin-2-one, i.e. a compound of Formula III wherein X is O, results.

Method I is best suited to 4-(mono or dialkylamino) derivatives in which the alkyl group is sterically hindered, e.g. t-butyl, t-amyl or t-octyl. For 4-alkylamino derivatives in which the alkyl group is less sterically hindered, alternative syntheses are preferable utilizing the isobiurets. Thus, methyl isothiourea is condensed with an alkyl isothiocyanate and the 1 - alkyl-4-S-methylisodithiobiuret formed is cyclized, e.g. by trimethyl ortho-esters. This intermediate reacts with amines to give the desired triazines in an over all reaction scheme analogous to that described by Piskala and Gut (loc. cit) and diagrammed below as Method II.

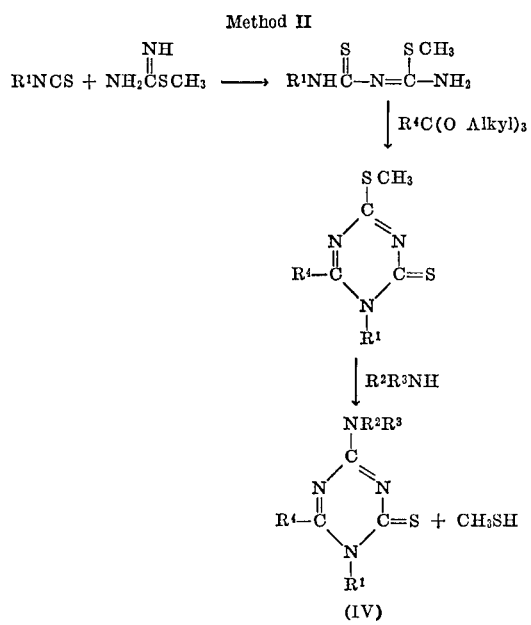

The reaction of the alkyl isothiocyanate with the isothiourea is preferably carried out in a solvent such as ketones, e.g. acetone, or alcohols such as methanol. Most conveniently a salt of the isothiourea, such as the sulfate, is used and this is neutralized with a base such as an alkali hydroxide, carbonate, bicarbonate or alkoxide to free the base, preferably just prior to the reaction with the alkyl isothiocyanate. The reaction may be conveniently carried out in a temperature range of −10° to 60° C., preferably 0° to 5° C. In some instances it is preferable to add the base in the minimum volume of water to a mixture of the alkyl isothiocyanate and the isothiourea in a solvent. A procedure for an analogous reaction is described in Orangic Syntheses 42, 87.

The ring closure is effected by the general procedure described above for Method I except that the reaction temperature is usually in the range of 0° to 100° C., preferably 40° to 70° C. Displacement of the 4-alkylthio group with the —NR$^2$R$^3$ group to give the compounds of Formula IV is effected by heating under reflux in benzene with one equivalent of the desired amine. The use of an acid catalyst is not essential for this reaction. Sterically hindered alkyl amines react very slowly under these conditions and it is preferable to run these reactions in dimethylformamide. An excess of the amine should be avoided since in certain cases this reacts with the thione group.

The corresponding compounds in the 2-oxygen series are obtained by a similar sequence as diagrammed below as Method III. A modification of the procedure is necessary for the 2-oxygen series in order to avoid in the first step the use of water which decomposes the alkyl isocyanate.

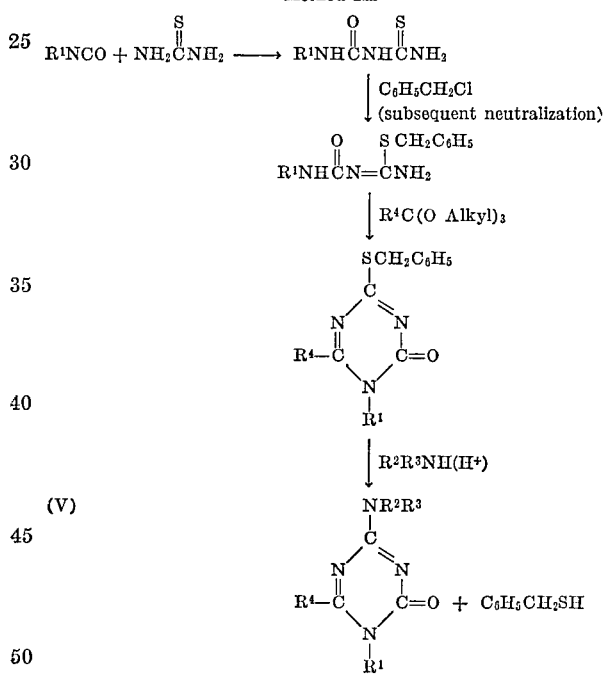

The reaction of the alkyl isocyanate with thiourea is conveniently carried out in a solvent such as dimethylformamide by heating a mixture of the two reagents at 50°–150° C., preferably 80°–100° C. for 1–30 hours. The 1-alkyl-4-thiobiuret may be conveniently isolated by drowning in water, filtration and recrystallization. Quaternization of the 1-alkyl-4-thiobiuret is achieved by heating with one equivalent of benzyl chloride in a solvent such as dimethylformamide for 1–30 hours. The hydrochloride may be isolated by removal of the solvent and precipitation with ethyl acetate. The free base obtained by treatment with bases, such as aqueous sodium hydroxide, is cyclized as described for Method I. Displacement of the 4-benzylthio group with the —NR$^2$R$^3$ group is effected by heating under reflux in benzene with at least one equivalent of the desired amine in the presence of an acid catalyst, such as p-toluenesulfonic acid. Sterically hindered alkyl amines do not react under these conditions.

It is taught by Piskala in Coll. Czech. Chem. Comm. 32, 3966 (1967) that amination of 4-methoxy-or 4-methylthio-1,2-dihydro-1,3,5-trazin-2-ones can produce compounds of structure V. Compounds included in this Piskala article are 1-methyl-4-methylamino - 1,2 - dihydro- 1,3,5-triazin-2-one and 1-methyl-4-dimethylamino-1,2-dihydrol-1,3,5-triazin-2-one.

In certain cases it may be preferable to synthesize the oxygen analogue (Formula V) from the sulfur analogue (Formula IV) by reaction with metal oxides or oxidizing agents, e.g. mercuric oxide or basic hydrogen peroxide.

Another method of synthesis is based upon use of cyanuric chloride as a starting material. It is used to prepare compounds of Formula IV where $R^4$ is hydrogen. This involves four steps:

(a) treatment of cyanuric chloride with an alcohol, such as methanol or ethanol, to replace one Cl with an alkoxy group.,
(b) treatment of the product from (a) with an amine $R^2R^3NH$ to replace a second Cl with the $R^2R^3N$— group,
(c) reduction of the product from (b), e.g. by hydrogenation over palladium to replace the third Cl with a hydrogen, and
(d) react the product from (c) with an iodide, $R^2I$.

The following reaction sequence diagrammed below as Method IV using methanol as the alcohol in step (a) depicts this method of synthesis.

Method IV

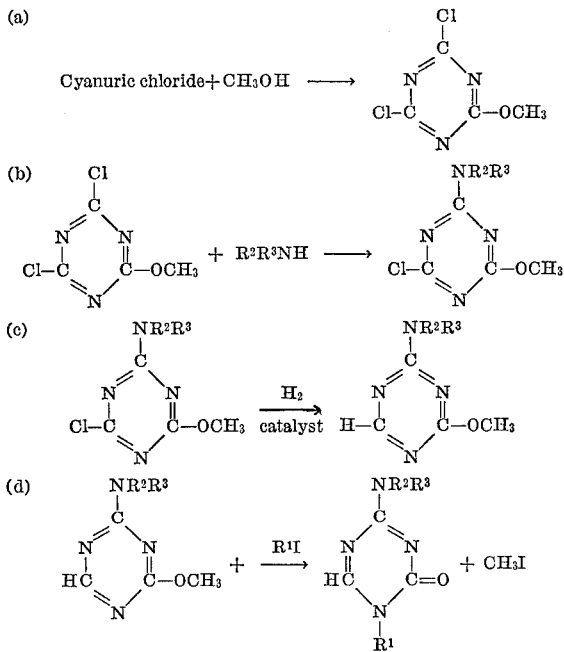

In the above reaction sequence steps (a) and (b) can be reversed, i.e. cyanuric chloride may first be reacted with the amine $R^2R^3NH$ to give a 2-(mono or dialkylamino)-4,6- dichlorotriazine and this is then subsequently reacted with an alcohol to produce a 2-(mono or dialkylamino)-4-alkoxy-6-chlorotriazine as depicted in step (b) above.

Compounds of the type produced in steps (a) and (b) are known in the literature, e.g. the monoalkoxy derivatives are discussed by J. R. Dudley et al. in J. A. C. S. 73, 2989 (1951) and the monoamino derivtaves in J. A. C. S. 73, 2984 (1951). For both steps (a) and (b) an acid scavenger is desirable. Suitable scavengers are alkali alkoxides, sodium or potassium carbonate, sodium hydroxide, a tertiary amine or an excess of the amine reactant. The reactions are usually facilitated by a solvent, water, ether or ethyl acetate being solvents which have been found to be suitable. In the reaction of the cyanuric chloride or alkoxy-dichlorotriazine with an azine a solvent is often chosen on the basis that the reactants are soluble and in which the by-product amine hydrochloride is insoluble. One particularly convenient way to prepare the monoalkoxy-monoamino-monochlorotriazines of step (b) in a relatively pure state is to react cyanuric chloride with the $R^2R^3NH$ amine in the presence of aqueous sodium hydroxide at about room temperature, followed by reaction with an alcoholic sodium hydroxide at 20–50° C.

The reduction of a chlorotriazine to the deschlorotriazine as in step (c) by catalytic reduction is a well-known synthetic procedure. Suitable reaction conditions are similar to those discussed in U.S. Pat. 3,427,146 for reduction of a 6-chloropyridazine to the corresponding pyridazine. A common catalyst is palladium black.

The conversion of an alkoxy-sym-triazine to a dihydrotriazinone is also a well-known type of reaction. The chemistry of symmetrical triazines is reviewed in Chemistry of Heterocyclic Compounds, edited by A. Weissburger, Interscience (1959) volume 13 and the above type of isomerization is discussed on pp. 398–400 of that volume. A similar type of reaction may be found in a paper by Bilman and Bjerrum, Berichte 50, 503 (1917). Isomerization of 2,4-dimethoxy-6-n-butylamino-sym-triazine is discussed by Schaefer, Dudley and Thurston in J. A. C. S. 73, 2996 (1951).

The compounds of Formula III when $R^3$ is hydrogen (Formula VII) can exist in isomeric forms as evidenced by their nuclear magnetic resonance spectra. The following equation depicts this

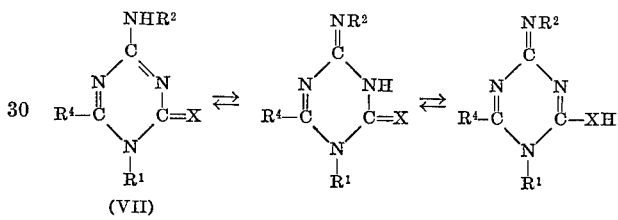

(VII)

The Formula VII type structure is used herein for convenience but it is to be understood that any of the isomeric forms are intended to be covered by this invention.

Tables II and III give examples of compounds of Formula III and their characterization. Specific illustrative preparations of Examples 8, 9, 14, 15, 28, 31, 32, 36 and 38 are set forth below.

EXAMPLE 8

Preparation of 1-ethyl-4-n-butylamino-
1,2-dihydro-1,3,5-triazin-2-one (a) Preparation of 1-ethyl-4-thiobiuret.—Thiourea (76 g., 1.0 mole) was dissolved in dimethylformamide (200 ml.) and ethyl isocyanate (71 g., 1.0 mole) was added. The solution was heated on a steam bath over night. When poured onto ice a crystalline solid precipitated and this was recrystallized from water to give 113 g. of white plates melting at 194° C. This is 70% yield of 1-ethyl-4-thiobiuret (literature melting point is 184° C.).

(b) Preparation of 1-ethyl-4-S-benzylisothiobiuret.—1-ethyl-4-thiobiuret (54.5 g., 0.37 mole) in dimethylformamide (100 ml.) was treated with benzyl chloride (46.9 g., 0.37 mole) and the solution heated on a steam bath over night. The solvent was removed and solid residue was triturated with ethyl acetate to give 76.5 g. (76% yield) of 1-ethyl-4-S-benzylisothiobiuret hydrochloride, melting at 160°–162.5° C. This was converted to the free base by treating an aqueous slurry with one equivalent of sodium hydroxide and extraction with ether. The resulting oil residue was found by analysis to contain 56.0% C, 6.3% H, 16.4% N, 7.1% O and 13.9% S; calculated for $C_{11}H_{15}N_3OS$ is 55.7% C, 6.4% H, 17.7% N, 6.7% O and 13.5% S. It was an 86% yield of 1-ethyl-4-S-benzylisothiobiuret.

(c) Preparation of 1-ethyl-4-benzylthio-1,2-dihydro-1,3,5-triazin-2-one.—1-ethyl-4-S-benzylisothiobiuret (148 g., 0.624 mole) was heated on a mantle with triethyl orthoformate (600 ml.) and 2 g. of p-toluenesulfonic acid, and ethanol was distilled out. After about 1.5 hours the evolution of ethanol ceased and the excess ester was removed under reduced pressure. The residue was recrystallized from ethyl acetate to give 128.2 g. of crystalline solid melting at 108°–111° C. This was found to contain by analysis 58.4% C, 5.3% H, 16.9% N, 6.8% O and 12.8% S; calculated for $C_{12}H_{13}N_3OS$ is 58.3% S, 5.3% H, 17.0% N, 6.5% O and 12.9% S. The product is 1-ethyl-4-benzyl-thio-1,2-dihydro-1,3,5-triazin-2-one.

1-ethyl-4-benzylthio-1,2-dihydro-1,3,5-triazin-2-one (17 g., 0.0688 mole) was dissolved in benzene (60 ml.) and heated under reflux 2–3 hours with n-butylamine (14 g., 0.192 mole) and n-toluene-sulfonic acid (300 mg.). The solvent was removed under reduced pressure and the residue was recrystallized from ethyl acetate to give 9.5 g. of a solid which was further purified by recrystallization from acetone-benzene (1:1). The product is a 66% yield of 1-ethyl-4-n-butylamino-1,2-dihydro-1,3,5-triazin-2-one.

EXAMPLE 9

Preparation of 1-ethyl-4-n-butylamino-1,2-dihydro-1,3,5-triazine-2-thione (a) Preparation of 1-ethyl-4-S-methylisodithiobiuret.—To a mixture of 50% sodium hydroxide (92 g., 1.15 mole), water (200 ml.) and acetone (300 ml.) at −20° C. was added 2-methyl-2-thioisourea sulfate (160 g., 0.575 mole). Ethyl isothiocyanate (100 g., 1.15 mole) was then added and the mixture was stirred at −20° C. for 30 minutes and then allowed to warm to room temperature with stirring overnight. The slurry was then warmed on a steam bath to about 65° C. for 30 minutes and was then cooled to give three phases. The top organic phase was separated and concentrated under reduced pressure to give a residue which was extracted with benzene. The solvent was removed leaving a 120 g. residue of amber oil. This was a mixture of 1-ethyl-4-S-methylisodithiobiuret with impurities which do not interfere with the subsequent cyclization.

(b) Preparation of 1 - ethyl - 4 - methylthio - 1,2-dihydro - 1,3,5 - triazine - 2 - thione.—The concentrate from part (a) above (70 g. of 64% purity, 0.25 mole) was heated with trimethyl orthoformate (145 g., 1.25 mole) and 0.9 g. of p-toluenesulfonic acid at 90°–95° C. for 3 hours. Upon cooling crystals separated and these were purified by recrystallization from ethyl acetate. The solid melted at 164°–166° C. It was found to contain 38.8% C, 5.0% H, 22.5% N and 33.2% S; calculated for $C_6H_9N_3S_2$ is 38.5% C, 4.8% H, 22.4% N and 34.2% S. The product is 1-ethyl-4-methylthio-1,2-dihydro-1,3,5-triazine-2-thione.

(c) Preparation of 1-ethyl-4-n-butylamino-1,2-dihydro-1,3,5-triazine-2-thione.—1-ethyl - 4 - methylthio-1,2-dihydro-1,3,5-triazine-2-thione (10 g., 0.0535 mole) was heated gently on a steam bath with n-butylamine (3.9 g., 0.0535 mole) in benzene until evolution of methyl mercaptan had practically ceased. On cooling crystals separated and were filtered off, washed with benzene and air dried to 5.5 g. This was a 48% yield of 1-ethyl-4-n-butylamino-1,2-dihydro-1,3,5-triazine-2-thione.

EXAMPLES 14 AND 15

Preparation of 1-ethyl-4-t-butylamino-1,2-dihydro-1,3,5-triazine-2-thione and its oxygen analog (a) Preparation of N-t-butyl-N'-(ethylthiocarbamoyl)guanidine.—A solution of 30.4 g. (0.2 mole) of t-butylguanidine hydrochloride in 300 ml. of dioxane and 30 ml. of water was made basic by the addition of 17 g. (0.21 mole) of 50% aqueous sodium hydroxide. To this was added dropwise over a period of 15 minutes 19.2 g. (0.22 mole) of ethyl isothiocyanate. The reaction mixture was stirred about 30 minutes at 40°–45° C. and was then poured into 1 l. of ice water. The resulting solid was isolated, dried and recrystallized from toluene to give 22.5 g. of white solid. Its infrared spectrum corresponded to the structure of N-t-butyl-N' - (ethylthiocarbamoyl)guanidine.

(b) Ring closure with an orthoformate.—A mixture of 15 g. (0.074 mole) of N-t-butyl-N'-(ethylthiocarbamoyl)guanidine, 53 g. (0.5 mole) of trimethyl orthoformate and 0.5 g. of p-toluenesulfonic acid monohydrate was stirred at 70°–80° C. for 30 hrs. Upon cooling to room temperature 9 g. of solid was isolated and after recrystallization from ethyl acetate this amounted to 7 g. (44% yield) of 1-ethyl-4-t-butylamino-1,2-dihydro-1,3,5-triazine-2-thione.

(c) Conversion of 1-ethyl-4-t-butylamino-1,2-dihydro-1,3,5-triazine-2-thione to its oxygen analog.—An alcoholic solution of 1-ethyl-4-t-butylamino-1,2-dihydro-1,3,5-triazine-2-thione was heated at reflux temperature over night with five equivalents of mercuric oxide. A good conversion to 1 - ethyl-4-t-butylamino-1,2-dihydro-1,3,5-triazin-2-one resulted.

EXAMPLE 28

Preparation of 1-n-butyl-4-t-octylamino-1,2-dihydro-1,3,5-triazin-2-one

A mixture of 8 g. (0.028 mole) of N-t-octyl-N'-(butylthiocarbamoyl)guanidine, 43.2 g. (0.405 mole) of trimethyl orthoformate and 0.5 g. p-toluenesulfonic acid was stirred 24 hrs. at 95°–98° C. The reaction mixture was cooled and poured into 500 ml. of ice water. A waxy precipitate was isolated and dried on a porous plate to give 6.8 g. of solid which was purified by recrystallization from hexane to give 5 g., melting point 98°–100° C. Analysis proved the compound to be 1-n-butyl-4-t-octylamino-1,2-dihydro-1,3,5-triazin-2-one; thus showing that hydrolysis of the sulfur atom had occurred under the reaction conditions.

EXAMPLES 31 AND 32

Preparation of 1-methyl-4-t-butylamino-6-ethyl-1,2-dihydro-1,3,5-triazine-2-thione and its oxygen analog A mixture of 18.8 g. (0.1 mole) of N-t-butyl-N'-(methylthiocarbamoyl)guanidine, 80 g. (0.5 mole) of triethyl orthopropionate and 1 g. of p-toluenesulfonic acid monohydrate was heated at 55°–60° C. for 20 hrs. The reaction mixture was then dissolved in toluene, washed three times with water, dried over magnesium sulfate and the solvent removed. The residue was triturated with ether to give 4.2 g. of a solid melting at 142°–151° C. and this after recrystallization from alcohol was 2 g. of a white solid melting at 150°–153° C. This was 1-methyl-4-t-butylamino - 6 - ethyl - 1,2-dihydro-1,3,5-triazine-2-thione.

The alcohol filtrate was evaporated to give 1.6 g. of light yellow solid which was 1-methyl-4-t-butylamino-6-ethyl-1,2-dihydro-1,3,5-triazin-2-one.

EXAMPLE 36

Preparation of 1-n-butyl-4-t-octylamino-6-methyl-1,2-dihydro-1,3,5-triazine-2-thione A mixture of 15 g. (0.052 mole) of N-t-octyl-N'-(butylthiocarbamoyl)guanidine, 60 g. (0.5 mole) of trimethyl orthoacetate and 0.5 g. of p-toluenesulfonic acid monohydrate was heated at 60°–70° C. for 20 hrs. The reaction mixture was dissolved in 300 ml. of toluene, washed three times with water, dried over magnesium sulfate and the solvent removed. The residue was dissolved in ether and cooled to give 4 g. of a white solid melting at 122°–124° C. Recrystallization from methylcyclohexane did not change the melting point. The solid was 1-n-butyl-4-t-octylamino-6-methyl-1,2-dihydro-1,3,5-triazine-2-thione.

EXAMPLE 38

Preparation of 1-ethyl-4-(N-methyl-N-t-butylamino)-1,2-dihydrotriazin-2-one

A solution of 2-ethoxy-4-(N-methyl-N-t-butylamino)-1,3,5-triazine (18 g., 0.086 mole, prepared from cyanuric chloride using ethanol, N-methyl-t-butylamine, followed by reduction) and ethyl iodide (15.6 g., 0.1 mole) in ethanol (100 ml.) was heated under reflux for 2 days. The solvent and excess reagent were removed. Water was added to the residue, the product was neutralized with potassium carbonate and extracted with chloroform. The resulting oil residue was chromatographed on alumina and eluted with benzene to give 8.5 g. of a solid which after recrystallization from 10% benzenein hexane had a melting point of 56–58° C. The product is 1-ethyl-4-(N-methyl-N-t-butylamino)-1,2-dihydro-1,3,5-triazin-2-one.

Acid addition salts of the 1-alkyl-4-(mono- and dialkylamino)-1,2-dihydro-1,3,5-triazin-2-ones and 1,3,5-triazine-2-thiones and of the 1-alkyl-4-(mono- and dialkylamino)-6-alkyl-1,2-dihydro-1,3,5-triazin-2-ones and 1,3,5-triazine-2-thiones of this invention may be prepared by dissolving the 1,2-dihydro-1,3,5-triazine in an appropriate solvent such as ether, adding an equivalent of the appropriate acid, preferably in a gaseous state or as a solution in the solvent used for the 1,2-dihydro-1,3,5-triazine, and isolating the resulting solid salt. For example the compound of Example 14 was converted to its hydrochloride by dissolving it in ether and passing in dry gaseous HCl. Examples of acids which will give acceptable salts include hydrochloric, nitric, phosphoric, sulfuric, oxalic and trichloroacetic.

TABLE I

Characterization of $R^2NH\overset{NH}{\underset{||}{C}}-NH\overset{S}{\underset{||}{C}}-NHR^1$ Intermediates

| R¹ | R² | Melting point (° C.) | Empirical formula | Analysis* C | H | N | S |
|---|---|---|---|---|---|---|---|
| CH₃ | t-C₄H₉ | Residual oil | | Identified by infrared spectrum | | | |
| C₂H₅ | Same | 107–109 | | Identified by infrared spectrum | | | |
| n-C₃H₇ | do | 108.5–110 | C₉H₂₀N₄S | 49.8 (50.0) | 9.2 (9.3) | 26.0 (25.9) | 14.6 (14.8) |
| iso-C₃H₇ | do | 150–151.5 | Same | 50.4 (50.0) | 9.3 (9.3) | 26.3 (25.9) | 15.2 (14.8) |
| n-C₄H₉ | do | 90–95 | C₁₀H₂₂N₄S | 51.4 (52.1) | 9.9 (9.6) | 24.3 (24.3) | 13.6 (13.9) |
| CH₃ | t-C₈H₁₇ | 178–180 | C₁₁H₂₄N₄S | 53.8 (54.0) | 9.7 (9.9) | 22.5 (22.3) | 13.1 (13.1) |
| C₂H₅ | Same | 126–128 | C₁₂H₂₆N₄S | 55.8 (55.8) | 10.2 (10.1) | 21.5 (21.7) | 12.2 (12.4) |
| n-C₄H₉ | do | 113–115 | C₁₄H₃₀N₄S | 58.4 (58.7) | 10.7 (10.5) | 19.6 (19.5) | 11.3 (11.2) |

*The number in parenthesis represents the theoretical value as calculated from the empirical formula.

TABLE II

Examples of $$R^4-\underset{\underset{R^1}{|}}{\overset{\overset{NR^2R^3}{|}}{\underset{N}{\overset{C}{\diagup\diagdown}}}}\overset{N}{\underset{N}{\diagdown\diagup}}C=X$$ Compounds

| Example No. | R¹ | R² | R³ | R⁴ | X | Name |
|---|---|---|---|---|---|---|
| 1 | CH₃ | t-C₄H₉ | H | H | O | 1-methyl-4-t-butylamino-1,2-dihydro-1,3,5-triazin-2-one. |
| 2 | CH₃ | Same | H | H | S | 1-methyl-4-t-butylamino-1,2-dihydro-1,3,5-triazine-2-thione. |
| 3 | C₂H₅ | C₂H₅ | H | H | O | 1-ethyl-4-ethylamino-1,2-dihydro-1,3,5-triazin-2-one. |
| 4 | Same | n-C₃H₇ | H | H | O | 1-ethyl-4-n-propylamino-1,2-dihydro-1,3,5-triazin-2-one. |
| 5 | do | Same | H | H | S | 1-ethyl-4-n-propylamino-1,2-dihydro-1,3,5-triazine-2-thione. |
| 6 | do | iso-C₃H₇ | H | H | O | 1-ethyl-4-isopropylamino-1,2-dihydro-1,3,5-triazin-2-one. |
| 7 | do | Same | H | H | S | 1-ethyl-4-isopropylamino-1,2-dihydro-1,3,5-triazine-2-thione. |
| 8 | do | n-C₄H₉ | H | H | O | 1-ethyl-4-n-butylamino-1,2-dihydro-1,3,5-triazin-2-one. |
| 9 | do | Same | H | H | S | 1-ethyl-4-n-butylamino-1,2-dihydro-1,3,5-triazine-2-thione. |
| 10 | do | sec-C₄H₉ | H | H | O | 1-ethyl-4-sec-butylamino-1,2-dihydro-1,3,5-triazin-2-one. |
| 11 | do | Same | H | H | S | 1-ethyl-4-sec-butylamino-1,2-dihydro-triazine-2-thione. |
| 12 | do | iso-C₄H₉ | H | H | O | 1-ethyl-4-isobutylamino-1,2-dihydro-1,3,5-triazin-2-one. |
| 13 | do | Same | H | H | S | 1-ethyl-4-isobutylamino-1,2-dihydro-1,3,5-triazine-2-thione. |
| 14 | do | t-C₄H₉ | H | H | O | 1-ethyl-4-t-butylamino-1,2-dihydro-1,3,5-triazon-2-one. |
| 15 | do | Same | H | H | S | 1-ethyl-4-t-butylamino-1,2-dihydro-1,3,5-triazine-2-thione. |
| 16 | do | n-C₅H₁₁ | H | H | O | 1-ethyl-4-n-pentylamino-1,2-dihydro-1,3,5-triazin-2-one. |
| 17 | do | Same | H | H | S | 1-ethyl-4-n-pentylamino-1,2-dihydro-1,3,5-triazine-2-thione. |
| 18 | do | t-C₅H₁₁ | H | H | S | 1-ethyl-4-t-pentylamino-1,2-dihydro-1,3,5-triazine-2-thione. |
| 19 | n-C₃H₇ | t-C₄H₉ | H | H | S | 1-propyl-4-t-butylamino-1,2-dihydro-1,3,5-triazine-2-thione. |
| 20 | iso-C₃H₇ | Same | H | H | O | 1-isopropyl-4-t-butylamino-1,2-dihydro-1,3,5-triazin-2-one. |
| 21 | Same | do | H | H | S | 1-isopropyl-4-t-butylamino-1,2-dihydro-1,3,5-triazine-2-thione. |
| 22 | n-C₄H₉ | do | H | H | S | 1-n-butyl-4-t-butylamino-1,2-dihydro-1,3,5-triazine-2-thione. |
| 23 | t-C₄H₉ | do | H | H | O | 1-t-butyl-4-t-butylamino-1,2-dihydro-1,3,5-triazin-2-one. |
| 24 | Same | do | H | H | S | 1-t-butyl-4-t-butylamino-1,2-dihydro-1,3,5-triazine-2-thione. |
| 25 | CH₃ | t-C₈H₁₇ | H | H | O | 1-methyl-4-t-octylamino-1,2-dihydro-1,3,5-triazin-2-one. |
| 26 | CH₃ | Same | H | H | S | 1-methyl-4-t-octylamino-1,2-dihydro-1,3,5-triazine-2-thione. |
| 27 | C₂H₅ | do | H | H | O | 1-ethyl-4-t-octylamino-1,2-dihydro-1,3,5-triazin-2-one. |
| 28 | n-C₄H₉ | do | H | H | O | 1-n-butyl-4-t-octylamino-1,2-dihydro-1,3,5-triazin-2-one. |
| 29 | Same | do | H | H | S | 1-n-butyl-4-t-octylamino-1,2-dihydro-1,3,5-triazine-2-thione. |
| 30 | CH₃ | t-C₄H₉ | H | CH₃ | S | 1-methyl-4-t-butylamino-6-methyl-1,2-dihydro-1,3,5-triazin-2-thione. |
| 31 | CH₃ | Same | H | C₂H₅ | O | 1-methyl-4-t-butylamino-6-ethyl-1,2-dihydro-1,3,5-triazin-2-one. |
| 32 | CH₃ | do | H | C₂H₅ | S | 1-methyl-4-t-butylamino-6-ethyl-1,2-dihydro-1,3,5-triazine-2-thione. |
| 33 | CH₃ | t-C₈H₁₇ | H | CH₃ | S | 1-methyl-4-t-octylamino-6-methyl-1,2-dihydro-1,3,5-triazine-2-thione. |
| 34 | CH₃ | do | H | C₂H₅ | S | 1-methyl-4-t-octylamino-6-ethyl-1,2-dihydro-1,3,5-triazine-2-thione. |
| 35 | C₂H₅ | do | H | C₂H₅ | S | 1-ethyl-4-t-octylamino-6-ethyl-1,2-dihydro-1,3,5-triazine-2-thione. |
| 36 | n-C₄H₉ | do | H | CH₃ | S | 1-n-butyl-4-t-octylamino-6-methyl-1,2-dihydro-1,3,5-triazine-2-thione. |
| 37 | Same | do | H | C₂H₅ | S | 1-n-butyl-4-t-octylamino-6-ethyl-1,2-dihydro-1,3,5-triazine-2-thione. |
| 38 | C₂H₅ | t-C₄H₉ | CH₃ | H | O | 1-ethyl-4-(N-methyl-N-t-butylamino)-1,2-dihydro-1,3,5-triazin-2-one. |
| 39 | The hydrochloride salt of Example 14. | | | | | |
| 40 | The acid oxalate salt of Example 14. | | | | | |
| 41 | The hydrochloride salt of Example 20. | | | | | |

TABLE III.—CHARACTERIZATION OF EXAMPLES

| Example No. | Melting point (° C.) | Empirical formula | C | | H | | N | | S (or O or Cl) | |
|---|---|---|---|---|---|---|---|---|---|---|
| 1 | 193–195 | $C_8H_{14}N_4O$ | 53.0 | (52.7) | 7.8 | (7.7) | 31.0 | (30.7) | a 9.1 | a (8.8) |
| 2 | 175–177 | $C_8H_{14}N_4S$ | 48.3 | (48.4) | 7.2 | (7.1) | 27.9 | (28.2) | 16.1 | (16.2) |
| 3 | 173–175 | $C_7H_{12}N_4O$ | 50.0 | (50.0) | 7.1 | (7.2) | 33.2 | (33.3) | a 10.7 | a (9.5) |
| 4 | 130–141 | $C_8H_{14}N_4O$ | 54.3 | (52.7) | 8.0 | (7.7) | 28.5 | (30.7) | a 9.7 | a (8.8) |
| 5 | 174–176 | $C_8H_{14}N_4S$ | 48.3 | (48.6) | 7.0 | (7.1) | 28.3 | (28.3) | 16.1 | (16.2) |
| 6 | 193–195 | $C_8H_{14}N_4O$ | 52.9 | (52.7) | 7.6 | (7.7) | 30.7 | (30.7) | a 9.1 | a (8.8) |
| 7 | 168–170 | $C_8H_{14}N_4S$ | 48.6 | (48.5) | 7.3 | (7.1) | 28.6 | (28.3) | 16.1 | (16.2) |
| 8 | 127–129 | $C_9H_{16}N_4O$ | 55.1 | (55.1) | 8.1 | (8.2) | 28.6 | (28.5) | a 8.3 | a (8.1) |
| 9 | 158.5–160 | $C_9H_{16}N_4S$ | 51.0 | (50.9) | 7.5 | (7.6) | 26.4 | (26.4) | 15.0 | (15.1) |
| 10 | 157–159 | $C_9H_{16}N_4O$ | 55.3 | (55.1) | 8.0 | (8.2) | 28.7 | (28.5) | a 8.5 | a (8.2) |
| 11 | 163–165 | $C_9H_{16}N_4S$ | 56.7 | (50.9) | 7.4 | (7.6) | 22.8 | (26.4) | 12.9 | (15.1) |
| 12 | 175.5–178.5 | $C_9H_{16}N_4O$ | 54.7 | (55.1) | 8.0 | (8.2) | 27.9 | (28.5) | a 10.0 | a (8.2) |
| 13 | 190.5–192.5 | $C_9H_{16}N_4S$ | 50.7 | (50.9) | 7.6 | (7.6) | 26.1 | (26.4) | 15.3 | (15.1) |
| 14 | 162–164 | $C_9H_{16}N_4O$ | 55.3 | (55.1) | 8.2 | (8.2) | 28.9 | (28.5) | a 8.2 | a (8.1) |
| 15 | 169–171 | $C_9H_{16}N_4S$ | 51.1 | (50.9) | 7.6 | (7.6) | 26.4 | (26.4) | 14.6 | (15.1) |
| 16 | 107–110 | $C_{10}H_{18}N_4O$ | 57.1 | (57.1) | 8.6 | (8.6) | 25.5 | (26.6) | a 7.6 | a 7.6) |
| 17 | 156–158 | $C_{10}H_{18}N_4S$ | 53.1 | (53.1) | 8.1 | (8.0) | 24.7 | (24.8) | 14.2 | (14.2) |
| 18 | 106–108 | $C_{10}H_{18}N_4S$ | 53.3 | (53.1) | 7.9 | (8.0) | 25.1 | (24.8) | 14.6 | (14.1) |
| 19 | 132–133.5 | $C_{10}H_{18}N_4S$ | 52.9 | (53.1) | 8.1 | (8.0) | 24.8 | (24.8) | 14.1 | (14.1) |
| 20 | 160–162.5 | $C_{10}H_{18}N_4O$ | 57.2 | (57.1) | 8.6 | (8.6) | 26.5 | (26.6) | a 7.9 | a (7.6) |
| 21 | 160–162 | $C_{10}H_{18}N_4S$ | 53.1 | (53.1) | 8.2 | (8.0) | 24.8 | (24.8) | 14.1 | (14.1) |
| 22 | 121–123 | $C_{11}H_{20}N_4S$ | 54.7 | (54.9) | 8.8 | (8.4) | 22.9 | (23.3) | 13.2 | (13.3) |
| 23 | 193.5–194 | $C_{11}H_{20}N_4O$ | 58.7 | (58.9) | 8.7 | (9.0) | 24.8 | (25.0) | a 7.9 | a (7.1) |
| 24 | 116–118 | $C_{11}H_{20}N_4S$ | 54.8 | (55.0) | 9.4 | (8.4) | 25.0 | (23.3) | 11.2 | (13.3) |
| 25 | 151–153 | $C_{12}H_{22}N_4O$ | 60.3 | (60.5) | 9.3 | (9.3) | 23.6 | (23.5) | 0.7 | (0) |
| 26 | 142–145 | $C_{12}H_{22}N_4S$ | 56.5 | (56.6) | 8.8 | (8.7) | 22.2 | (22.0) | 12.2 | (12.6) |
| 27 | 124–126 | $C_{13}H_{24}N_4O$ | 61.5 | (61.9) | 9.9 | (9.6) | 22.5 | (22.2) | 0.5 | (0) |
| 28 | 98–100 | $C_{15}H_{28}N_4O$ | 64.1 | (64.2) | 10.2 | (10.0) | 19.8 | (20.0) | | |
| 29 | 82–83 | $C_{15}H_{28}N_4S$ | 60.7 | (60.8) | 9.7 | (9.5) | 18.8 | (18.9) | 10.5 | (10.8) |
| 30 | 176–179 | $C_9H_{16}N_4S$ | 51.3 | (50.9) | 7.6 | (7.6) | 26.1 | (26.4) | 14.9 | (15.1) |
| 31 | 165–168 | $C_{10}H_{18}N_4O$ | 56.9 | (57.1) | 8.6 | (8.6) | 26.7 | (26.6) | | |
| 32 | 150–153 | $C_{10}H_{18}N_4S$ | 52.4 | (52.9) | 7.6 | (7.9) | 23.9 | (24.5) | 13.0 | (14.0) |
| 33 | 115–117 | $C_{13}H_{24}N_4S$ | 58.1 | (58.2) | 8.9 | (9.0) | 20.8 | (20.9) | | |
| 34 | 108–110 | $C_{14}H_{26}N_4S$ | 60.4 | (59.5) | 9.3 | (9.3) | 19.0 | (19.8) | 10.0 | (11.3) |
| 35 | 108–110 | $C_{15}H_{28}N_4S$ | 60.7 | (60.8) | 9.7 | (9.5) | 19.2 | (18.6) | 10.5 | (10.8) |
| 36 | 122–124 | $C_{16}H_{30}N_4S$ | 62.0 | (61.9) | 10.0 | (9.7) | 18.7 | (18.0) | 9.3 | (10.3) |
| 37 | 126–128 | $C_{17}H_{32}N_4S$ | 60.3 | (62.6) | 10.0 | (9.9) | 17.1 | (17.2) | 8.8 | (9.9) |
| 38 | 56–58 | $C_{10}H_{18}N_4O$ | 57.0 | (57.1) | 8.8 | (8.6) | 26.8 | (26.7) | a 7.7 | a (7.6) |
| 39 | >230 | $C_9H_{17}ClN_4O$ | 46.7 | (46.5) | 7.4 | (7.4) | 23.8 | (24.1) | b 15.2 | b (15.2) |
| 40 | c 188 | $C_{11}H_{18}N_4O_5$ | 46.2 | (46.2) | 6.4 | (6.3) | 19.6 | (19.6) | a 27.8 | a (27.9) |
| 41 | >230 | $C_{10}H_{19}ClN_4O$ | 48.8 | (48.7) | 7.9 | (7.8) | 22.5 | (22.7) | b 14.1 | b (14.4) |

*The number in parenthesis represents the theoretical value as calculated from the empirical formula.
a = Analysis for oxygen.    b = Analysis for chlorine.    c = Dec.

The 1,2-dihydro-1,3,5-triazines of this invention possess biocidal properties and in this respect are particularly useful as herbicides. The most active of these compounds possess both preemergence and postemergence herbicidal properties. For such purposes these compounds are most often used as solutions or formulations so as to render them suitable for subsequent dissemination as herbicides. For example the 1,2-dihydro-1,3,5-triazines may be formulated as wettable powders, emulsifiable concentrates, dusts, granular formulations, aerosols or flowable emulsion concentrates. In such formulations, the compounds are extended with a liquid or solid carrier and, when desired, suitable surfactants are incorporated.

It is usually desirable, particularly in postemergence applications, to include adjuvants, such as wetting agents, spreading agents, dispersing agents, stickers, adhesives and the like in accordance with agricultural practices. Such adjuvants commonly used in the art may be found in the John W. McCutcheon, Inc. publication "Detergents and Emulsifiers 1969 Annual." Numerous polymer latices or aqueous dispersions, particularly those in which the polymers per se exhibit some degree of tack, will also function effectively as adherent or sticking agents. Typical of such compounds are homo-, co-, or terpolymers of a wide variety of vinyl monomers, particularly combinations of acrylate and methacrylate esters, vinyl acetate, vinyl chloride, styrene, butadiene, isoprene, etc. Terpolymers containing acrylate and methacrylate esters and a minor proportion of acrylic and methacrylic acids are also very effective. The compounds of this invention may also be combined with agricultural oils such as refined mineral oils.

The compounds of this invention may be dissolved in an appropriate solvent such as alcohols, ketones, aromatic hydrocarbons, dimethyl-formamide or dimethyl sulfoxide or mixtures of these and used as such or extended with water. The concentration of the solution may vary from 2% to 98% with a preferred range being 25% to 75%.

For the preparation of emulsifiable concentrates, the compound may be dissolved in organic solvents, such as xylene, pine oil, orthodichlorobenzene, methyl oleate, or a mixture of solvents, together with an emulsifying agent which permits dispersion in water. The concentration of the active ingredient in emulsifiable concentrates is usually 10% to 25% and in flowable emulsion concentrates, this may be as high as 75%.

Wettable powders suitable for spraying may be prepared by admixing the compound with a finely divided solid, such as clays, inorganic silicates and carbonates, and silicas and incorporating wetting agents, sticking agents, and/or dispersing agents in such mixtures. The concentration of active ingredients in such formulations is usually in the range of 20% to 98%, preferably 40% to 75%.

Dusts are prepared by mixing the compounds of this invention with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredient are commonly made and are subsequently diluted to 1% to 10% use concentration.

The 1,2-dihydro-1,3,5-triazines can be applied as herbicidal sprays by methods commonly employed, such as conventional high-gallonage hydraulic sprays, low gallonage sprays, airblast spray, aerial sprays and dusts. For low volume applications a solution of the compound is usually used. The dilution and rate of application will depend upon such factors as the type of equipment employed, the method of application, the area to be treated and the type and stage of development of the weeds, but the amount is usually in the range of 0.25 lb. to 25 lbs. per acre of the active ingredient.

The 1,2-dihydro-1,3,5-triazines of this invention were evaluated for herbicidal activity in standard herbicide screening procedures.

In one such test seeds of selected crops and weeds were planted in soil in pots. For preemergence tests these pots were treated immediately with the test compound. For postemergence tests the seeds were allowed to germinate and the plants to grow for two weeks at which time they were treated by foliar application or by drenching the soil with the test chemical. For these preliminary tests 150 mg. of the test compound was dissolved in 30 ml. of acetone. Ten ml. of this solution was diluted to 250 ml. with water and this was used to drench the soil in the pots constituting the preemergence test. For the foliar postemergence test 10 ml. of the stock solution was uniformly sprayed onto the postemergence pots. For a drench postemergence test 10 ml. of the stock solution was diluted to 250 ml. with water and this was poured onto the soil around the base of the growing plants in the postemergence pots. In all cases the toxicant amounts to about 10 lbs. per acre. Four types of monocotyledonous plants were used and these were millet (*Setaria italica*), ryegrass (*Lolium perenne*), sorghum (*Sorghum vulgare*) and wild oat (*Avena fatua*). Four types of dicotyledonous plants were used and these were curly dock (*Rumex crispus*), flax (*Linum usitatissimum*), tomato (*Lycopersicum esculentum*) and velvetleaf (*Abutilon theophrasti*). About 2 weeks after application of the candidate herbicidal agents, the state of growth and the phytotoxic effects were evaluated. Table IV gives the average percent control for the monocotyledonous (Mono) and the dicotyledonous (Di) plant species. In a few instances different plant species were used and are so indicated.

Other preemergence and foliar postemergence greenhouse tests similar to the above were run using more plant species and lower application rates (pounds per acre, lbs./A.). In these tests flats were sprayed using a carrier volume of 50 gallons per acre. The plant species involved were:

Monocotyledons:
  A—Barnyardgrass (*Echinochloa crusgalli*)
  B—Corn (*Zea maize*)
  C—Foxtail (*Setaria faberii*)
  D—Millet (*Setaria italica*)
  E—Rice (*Oryzae sativa*)
  F—Ryegrass (*Lolium perenne*)
  G—Sudangrass (*Sorghum sudanensis*)
  H—Wheat (*Triticum vulgare*)
  I—Wild oat (*Avena fatua*)
Dicotyledons:
  J—Alfalfa (*Medicago sativa*)
  K—Cotton (*Gossypium hirsutum*)
  L—Curly dock (*Rumex crispus*)
  M—Flax (*Linum usitatissimum*)
  N—Lambsquarters (*Chenopodium album*)
  O—Mustard (*Brassica kaber*)
  P—Pigweed (*Amaranthus retroflexus*)
  Q—Soybean (*Glycine max*)
  R—Tomato (*Lycopersicum esculentum*)
  S—Velvetleaf (*Abutilon theophrasti*)
  T—Wild carrot (*Daucus carota*)

Table V gives the percent control of the various plant species (designated by the letter identification given above) for several examples of the 1,2-dihydro-1,3,5-triazines.

TABLE IV

[Herbicidal evaluations on 1,2-dihydro-1,3,5-triazines]

| Treatment Example | Plants | Percent control at 10 lbs./a. | | |
|---|---|---|---|---|
| | | Preemergence | Postemergence Spray | Postemergence Drench |
| 1 | Mono | 87 | 80 | [1] 95 |
| | Di | 90 | 97 | [2] 100 |
| 2 | Mono | 68 | 95 | 95 |
| | Di | 85 | 98 | 100 |
| 3 | Mono | 0 | 50 | [1] 0 |
| | Di | 0 | 100 | [2] 0 |
| 4 | Mono | 0 | 52 | [1] 0 |
| | Di | 0 | 80 | [2] 0 |
| 5 | Mono | 0 | 40 | [1] 0 |
| | Di | 0 | 90 | [2] 0 |
| 6 | Mono | 0 | 80 | [1] 30 |
| | Di | 22 | 100 | [2] 100 |
| 7 | Mono | 0 | 80 | [1] 5 |
| | Di | 20 | 100 | [2] 95 |
| 8 | Mono | 0 | 52 | [1] 0 |
| | Di | 0 | 92 | [2] 0 |
| 9 | Mono | 0 | 40 | [1] 0 |
| | Di | 0 | 82 | [2] 0 |
| 10 | Mono | 5 | 80 | [1] 95 |
| | Di | 18 | 110 | [2] 80 |
| 11 | Mono | 0 | 42 | [1] 10 |
| | Di | 0 | 98 | [2] 45 |
| 12 | Mono | 0 | 42 | [1] 5 |
| | Di | 0 | 92 | [2] 0 |
| 13 | Mono | 0 | 40 | [1] 0 |
| | Di | 25 | 75 | [2] 0 |
| 14 | Mono | 70 | 95 | 97 |
| | Di | 95 | 100 | 100 |
| 15 | Mono | 85 | 92 | 100 |
| | Di | 92 | 100 | 100 |
| 16 | Mono | 0 | 60 | [1] 5 |
| | Di | 0 | 98 | [2] 0 |
| 17 | Mono | 0 | 32 | [1] 0 |
| | Di | 0 | 98 | [2] 0 |
| 18 | Mono | 80 | 95 | [1] 100 |
| | Di | 90 | 100 | [2] 50 |
| 19 | Mono | 0 | 38 | 0 |
| | Di | 0 | 95 | 90 |
| 20 | Mono | 72 | 100 | [1] 100 |
| | Di | 95 | 100 | [2] 100 |
| 21 | Mono | 82 | 92 | 75 |
| | Di | 80 | 100 | 98 |
| 22 | Mono | 10 | 18 | 12 |
| | Di | 30 | 78 | 78 |
| 23 | Mono | 92 | 75 | [1] 60 |
| | Di | 77 | 100 | [2] 100 |
| 24 | Mono | 0 | 72 | [1] 0 |
| | Di | 15 | 100 | [2] 0 |
| 25 | Mono | 8 | 30 | 5 |
| | Di | 20 | 60 | 15 |
| 26 | Mono | 18 | 28 | 20 |
| | Di | 28 | 62 | 20 |
| 27 | Mono | 22 | 22 | 5 |
| | Di | 48 | 92 | 48 |
| 28 | Mono | 0 | 18 | 0 |
| | Di | 0 | 55 | 0 |
| 29 | Mono | 0 | 12 | 0 |
| | Di | 0 | 68 | 0 |
| 30 | Mono | 0 | 22 | 0 |
| | Di | 0 | 60 | 0 |
| 31 | Mono | 0 | 28 | 0 |
| | Di | 10 | 62 | 0 |
| 32 | Mono | 0 | 18 | 0 |
| | Di | 2 | 40 | 0 |
| 33 | Mono | 0 | 15 | 0 |
| | Di | 0 | 58 | 0 |
| 34 | Mono | 0 | 10 | 0 |
| | Di | 0 | 30 | 0 |
| 35 | Mono | 0 | 10 | 0 |
| | Di | 0 | 60 | 0 |
| 36 | Mono | 0 | 35 | 0 |
| | Di | 0 | 80 | 0 |
| 37 | Mono | 0 | 8 | 0 |
| | Di | 0 | 22 | 0 |
| 38 | Mono [3] | 65 | 90 | [1] 100 |
| | Di [4] | 77 | 97 | [2] 100 |
| 39 | Mono [5] | 45 | 100 | [1] 100 |
| | Di [6] | 80 | 100 | [2] 100 |
| 40 | Mono [5] | 52 | 100 | [1] 100 |
| | Di [6] | 92 | 100 | [2] 100 |
| 41 | Mono [5] | 42 | 100 | [1] 100 |
| | Di [6] | 77 | 100 | [2] 100 |

[1] Sorghum (*Sorghum vulgare*) and wheat were the plant species tested.
[2] Dwarf beans (*Phaseolus vulgaris*) and cotton were the plant species tested.
[3] Crabgrass (*Digitaria sanguinalis*) replacing millet.
[4] Bindweed (*Convolvulus arvensis*) replacing velvetleaf.
[5] Plant species tested were barnyardgrass, crabgrass, Johnsongrass (*Sorghum halepense*) and wild oat.
[6] Plant species tested were bindweed, curly dock, velvetleaf and mustard.

TABLE V.—PERCENT CONTROL

(a) Preemergence Activity of 1,2-dihydro-1,3,5-triazines

| lb./a. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 38 | 39 | 40 | 41 |
|---|---|---|---|---|---|---|---|---|---|---|---|---|---|---|---|---|---|---|---|---|---|---|---|---|---|---|---|---|---|---|---|
| | 2 | 6 | 2 | 2 | 4 | 2 | 4 | 2 | 4 | 2 | 4 | 2 | 4 | 2 | 4 | 2 | 4 | 2 | 1 | 2 | 1 | 6 | 2 | 2 | 6 | 6 | 6 | 4 | 1 | 1 | 1 |
| Plant species: | | | | | | | | | | | | | | | | | | | | | | | | | | | | | | | |
| A | 60 | 20 | 0 | 0 | 40 | 0 | 0 | 0 | 0 | 0 | 0 | 0 | 0 | 0 | 0 | 0 | 0 | 0 | 0 | 10 | 50 | 0 | 0 | 0 | 0 | 0 | 0 | 40 | 0 | 50 | 60 |
| B | 10 | 0 | 0 | 30 | 30 | 50 | 0 | 0 | 0 | 0 | 0 | 0 | 10 | 90 | 20 | 20 | 0 | 0 | 0 | 30 | 0 | 0 | 0 | 20 | 0 | 0 | 0 | 0 | 80 | 0 | 0 |
| C | 0 | 60 | 0 | 0 | 20 | 0 | 0 | 0 | 0 | 0 | 0 | 10 | 20 | 80 | 20 | 10 | 60 | 60 | 0 | 60 | 60 | 0 | 30 | 20 | 0 | 20 | 0 | 50 | 0 | 0 | 0 |
| D | 50 | 60 | 40 | 0 | 60 | 0 | 0 | 0 | 0 | 0 | 0 | 0 | 0 | 80 | 30 | 20 | 0 | 20 | 0 | 30 | 40 | 0 | 40 | 0 | 0 | 0 | 0 | 10 | 0 | 0 | 10 |
| E | 60 | 30 | 0 | 0 | 40 | 0 | 0 | 0 | 0 | 0 | 0 | 0 | 0 | 50 | 10 | 0 | 0 | 0 | 0 | 50 | 30 | 0 | 10 | 30 | 0 | 0 | 0 | 20 | 0 | 0 | 0 |
| F | 10 | 20 | 0 | 60 | 0 | 0 | 0 | 0 | 0 | 0 | 0 | 40 | 0 | 60 | 0 | 80 | 0 | 20 | 20 | 0 | 0 | 0 | 100 | 0 | 100 | 0 | 0 | 10 | 10 | 10 | 10 |
| G | 30 | 0 | 0 | 0 | 0 | 0 | 0 | 0 | 0 | 0 | 0 | 0 | 0 | 40 | 40 | 0 | 0 | 0 | 50 | 20 | 0 | 0 | 0 | 0 | 0 | 0 | 70 | 0 | 0 | 0 | 0 |
| H | 30 | 0 | 100 | 0 | 50 | 0 | 0 | 0 | 0 | 0 | 0 | 40 | 0 | 100 | 100 | 100 | 90 | 20 | 0 | 90 | 40 | 0 | 100 | 0 | 100 | 0 | 0 | 0 | 0 | 10 | 0 |
| I | 100 | 10 | 0 | 20 | 0 | 90 | 0 | 0 | 0 | 0 | 0 | 0 | 0 | 0 | 0 | 0 | 0 | 0 | 0 | 0 | 0 | 50 | 0 | 0 | 0 | 0 | 0 | 0 | 0 | 0 | 30 |
| J | 30 | 100 | 80 | 60 | 0 | 90 | 0 | 40 | 0 | 60 | 0 | 40 | 0 | 30 | 20 | 20 | 0 | 20 | 20 | 20 | 40 | 0 | 50 | 20 | 0 | 0 | 0 | 0 | 10 | 30 | 10 |
| K | 90 | 90 | 50 | 90 | 50 | 50 | 0 | 0 | 60 | 0 | 0 | 0 | 60 | 60 | 40 | 50 | 40 | 40 | 50 | 90 | 0 | 0 | 60 | 0 | 100 | 0 | 70 | 0 | 0 | 0 | 0 |
| L | 80 | 0 | 90 | 0 | 0 | 20 | 0 | 0 | 0 | 0 | 0 | 0 | 0 | 30 | 80 | 40 | 0 | 0 | 0 | 50 | 40 | 30 | 100 | 0 | 0 | 0 | 0 | 80 | 0 | 60 | 30 |
| M | 80 | 100 | 30 | 80 | 50 | 20 | 0 | 0 | 0 | 0 | 0 | 20 | 0 | 20 | 40 | 40 | 0 | 40 | 60 | 50 | 0 | 100 | 60 | 0 | 80 | 20 | 90 | 70 | 70 | 90 | 0 |
| N | 50 | 90 | 80 | 90 | 50 | 50 | 90 | 0 | 0 | 50 | 0 | 50 | 50 | 90 | 80 | 70 | 0 | 60 | 0 | 100 | 90 | 0 | 90 | 60 | 100 | 0 | 70 | 100 | 80 | 90 | 80 |
| O | 90 | 90 | 60 | 50 | 20 | 0 | 0 | 0 | 0 | 0 | 0 | 0 | 0 | 90 | 70 | 70 | 0 | 0 | 40 | 0 | 30 | 30 | 0 | 10 | 50 | 0 | 40 | 100 | 20 | 0 | 60 |
| P | 90 | 60 | 0 | 0 | 0 | 0 | 90 | 0 | 0 | 0 | 0 | 80 | 0 | 90 | 80 | 20 | 40 | 0 | 0 | 80 | 90 | 50 | 0 | 60 | 80 | 0 | 90 | 100 | 80 | 90 | 0 |
| Q | 60 | 90 | 0 | 40 | 0 | 0 | 90 | 0 | 0 | 0 | 0 | 0 | 0 | 0 | 0 | 50 | 0 | 90 | 40 | 90 | 0 | 100 | 90 | 10 | 0 | 100 | 70 | 100 | 100 | 0 | 0 |
| R | 90 | 20 | 0 | 0 | 0 | 100 | 0 | 0 | 0 | 0 | 0 | 0 | 0 | 90 | 70 | 70 | 90 | 20 | 0 | 90 | 30 | 0 | 0 | 60 | 0 | 0 | 40 | 0 | 80 | 90 | 90 |
| S | 100 | 60 | 40 | 40 | 0 | 0 | 90 | 0 | 0 | 50 | 0 | 80 | 80 | 90 | 80 | 80 | 0 | 90 | 40 | 90 | 0 | 80 | 0 | 0 | 0 | 0 | 90 | 100 | 0 | 0 | 0 |
| T | 100 | 60 | 90 | 50 | 0 | 100 | 0 | 50 | 0 | 0 | 0 | 0 | 0 | 90 | 70 | 100 | 0 | 100 | 100 | 60 | 30 | 0 | 0 | 0 | 0 | 0 | 0 | 100 | 40 | 40 | 100 |

(b) Postemergence Activity of 1,2-dihydro-1,3,5-triazines

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 38 | 39 | 40 | 41 |
|---|---|---|---|---|---|---|---|---|---|---|---|---|---|---|---|---|---|---|---|---|---|---|---|---|---|---|---|---|---|---|---|
| A | 40 | 80 | 0 | 0 | 10 | 0 | 0 | 10 | 0 | 0 | 20 | 0 | 0 | 0 | 90 | 0 | 20 | 90 | 10 | 100 | 70 | 40 | 0 | 0 | 10 | 0 | 0 | 60 | 90 | 99 | 95 |
| B | 40 | 20 | 0 | 0 | 10 | 0 | 10 | 20 | 0 | 20 | 20 | 0 | 10 | 0 | 50 | 0 | 0 | 60 | 0 | 100 | 20 | 60 | 0 | 10 | 0 | 0 | 0 | 20 | 0 | 0 | 0 |
| C | 60 | 80 | 0 | 0 | 20 | 0 | 20 | 60 | 40 | 0 | 70 | 0 | 90 | 0 | 80 | 0 | 40 | 80 | 30 | 90 | 100 | 0 | 0 | 50 | 0 | 0 | 40 | 100 | 100 | 100 | 100 |
| D | 30 | 90 | 0 | 0 | 20 | 40 | 50 | 10 | 0 | 20 | 90 | 0 | 20 | 0 | 90 | 0 | 0 | 80 | 60 | 99 | 80 | 30 | 0 | 30 | 0 | 0 | 50 | 100 | 30 | 20 | 30 |
| E | 40 | 100 | 0 | 0 | 20 | 0 | 80 | 20 | 0 | 0 | 0 | 0 | 0 | 0 | 100 | 0 | 0 | 100 | 50 | 90 | 20 | 0 | 20 | 0 | 10 | 0 | 20 | 30 | 100 | 100 | 50 |
| F | 80 | 70 | 0 | 0 | 40 | 20 | 100 | 10 | 30 | 20 | 0 | 20 | 0 | 40 | 90 | 0 | 0 | 100 | 20 | 100 | 70 | 0 | 50 | 0 | 30 | 20 | 40 | 50 | 60 | 60 | 30 |
| G | 20 | 20 | 0 | 0 | 20 | 0 | 80 | 0 | 40 | 0 | 0 | 0 | 0 | 100 | 90 | 0 | 0 | 100 | 50 | 100 | 20 | 30 | 30 | 0 | 40 | 50 | 10 | 60 | 60 | 60 | 50 |
| H | 60 | 100 | 0 | 0 | 20 | 100 | 90 | 10 | 50 | 20 | 100 | 0 | 100 | 40 | 100 | 50 | 50 | 100 | 20 | 100 | 70 | 80 | 50 | 0 | 30 | 50 | 40 | 60 | 70 | 100 | 100 |
| I | 80 | 80 | 0 | 0 | 20 | 30 | 80 | 40 | 80 | 50 | 0 | 0 | 60 | 100 | 100 | 70 | 70 | 100 | 40 | 100 | 60 | 60 | 60 | 0 | 50 | 20 | 40 | 40 | 90 | 100 | 80 |
| J | 70 | 100 | 100 | 50 | 0 | 100 | 0 | 90 | 10 | 100 | 0 | 80 | 0 | 0 | 100 | 90 | 0 | 100 | 90 | 100 | 0 | 60 | 0 | 40 | 80 | 50 | 70 | 100 | 100 | 100 | 100 |
| K | 100 | 100 | 90 | 70 | 20 | 100 | 20 | 100 | 80 | 20 | 100 | 0 | 20 | 30 | 100 | 0 | 0 | 100 | 40 | 100 | 100 | 0 | 80 | 10 | 60 | 60 | 100 | 100 | 100 | 100 | 100 |
| L | 100 | 100 | 90 | 50 | 20 | 100 | 50 | 100 | 30 | 100 | 70 | 0 | 90 | 40 | 100 | 50 | 0 | 100 | 30 | 100 | 100 | 20 | 40 | 30 | 70 | 20 | 60 | 40 | 70 | 100 | 80 |
| M | 100 | 100 | 100 | 80 | 20 | 100 | 20 | 90 | 30 | 60 | 90 | 20 | 30 | 40 | 100 | 40 | 0 | 100 | 50 | 100 | 70 | 100 | 50 | 0 | 100 | 60 | 60 | 40 | 100 | 100 | 100 |
| N | 100 | 100 | 90 | 100 | 0 | 100 | 30 | 80 | 0 | 100 | 30 | 10 | 40 | 0 | 100 | 60 | 90 | 100 | 50 | 100 | 100 | 60 | 30 | 20 | 30 | 80 | 70 | 20 | 60 | 100 | 100 |
| O | 100 | 100 | 40 | 70 | 0 | 100 | 30 | 50 | 0 | 60 | 30 | 0 | 30 | 0 | 100 | 0 | 0 | 80 | 90 | 100 | 90 | 50 | 60 | 0 | 50 | 30 | 100 | 90 | 100 | 100 | 100 |
| P | 100 | 100 | 20 | 60 | 0 | 100 | 0 | 80 | 10 | 30 | 70 | 0 | 10 | 0 | 100 | 0 | 20 | 90 | 40 | 100 | 50 | 40 | 30 | 10 | 70 | 0 | 50 | 20 | 90 | 90 | 100 |
| Q | 100 | 100 | 30 | 20 | 0 | 100 | 0 | 20 | 30 | 70 | 60 | 0 | 10 | 0 | 100 | 0 | 0 | 80 | 20 | 100 | 30 | 50 | 0 | 20 | 0 | 0 | 20 | 0 | 40 | 90 | 60 |
| R | 100 | 100 | 80 | 40 | 0 | 100 | 90 | 10 | 0 | 0 | 0 | 0 | 100 | 0 | 100 | 0 | 20 | 100 | 100 | 100 | 100 | 90 | 70 | 20 | 20 | 30 | 100 | 0 | 100 | 100 | 100 |
| S | 100 | 100 | 40 | 40 | 0 | 100 | 0 | 80 | 0 | 30 | 0 | 0 | 30 | 0 | 100 | 0 | 0 | 100 | 100 | 100 | 0 | 0 | 30 | 0 | 0 | 0 | 20 | 100 | 100 | 100 | 100 |
| T | 100 | 100 | 50 | 50 | 0 | 100 | 0 | 0 | 0 | 0 | 0 | 0 | 100 | 0 | 100 | 0 | 0 | 100 | 100 | 100 | 0 | 0 | 50 | 20 | 0 | 0 | 0 | 100 | 100 | 100 | 100 |

In some instances it may be desirable to add one or more other pesticides. Other herbicides which can be incorporated to provide additional advantages and effectiveness include:

CARBOXYLIC ACIDS AND DERIVATIVES 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
2-methyl-4-chlorophenoxyacetic acid and its salts and esters
2-(2,4,5-trichlorophenoxy)propionic acid and its salts and esters
4-(2,4-dichlorophenoxy)butyric acid and its salts and esters
2,3,6-trichlorophenylacetic acid and its salts
3,6-endoxohexahydrophthalic acid
dimethyl 2,3,5,6-tetrachloroterephthalate
trichloroacetic acid and its salts
2,2-dichloropropionic acid and its salts
2,3-dichloroisobutyric acid and its salts 4-(2-methyl-4-chlorophenoxy)butyric acid and its salts and esters

CARBAMIC ACID DERIVATIVES ethyl N,N-di(n-propyl)thiolcarbamate
propyl N,N-di(n-propyl)thiolcarbamate
ethyl N-ethyl-N-(n-butyl)thiolcarbamate
propyl N-ethyl-N-(n-butyl)thiolcarbamate
2-chloroallyl N,N-diethyldithiocarbamate
N-methyldithio-carbamic acid salts
ethyl 1-hexamethyleneiminecarbothiolate
isopropyl N-phenylcarbamate
isopropyl N-(m-chlorophenyl)carbamate
4-chloro-2-butynyl N-(m-chlorophenyl)carbamate
methyl N-(3,4-dichlorophenyl)carbamate

PHENOLS dinitor-o-(sec.-butyl)phenol and its salts
pentachlorophenol and its salts

SUBSTITUTED UREAS 3-(3,4-dichlorophenyl)-1,1,-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea dichloral urea
3-[4-(4-chlorophenoxy)phenyl]-1,1-dimethylurea

SUBSTITUTED TRIAZINES 2-chloro-4,6-bis(ethylamino)-s-triazine
2-chloro-4-ethtylamino-6-isopropylamino-s-triazine
2-chloro-4,6-bis(methoxypropylamino)-s-triazine
2-methoxy-4,6-bis(isopropylamino)-s-triazine
2-chloro-4-ethylamino-6-(3-methoxypropylamino)-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-chloro-4,6-bis(isopropylamino)-s-triazine
2-methoxy-4,6-bis(ethylamino)-s-triazine
2-methoxy-4-ethylamino-6-isopropylamino-s-triazine
2-methylmercapto-4-(2-methoxyethylamino)-6-isopropylamino-s-triazine

DIPHENYL ETHER DERIVATIVES 2,4-dichloro-4'-nitrodiphenyl ether
2,4,6-trichloro-4'-nitrophenyl ether
2,4-dichloro-6-fluoro-4'-nitrodiphenyl ether
3-methyl-4'-nitrodiphenyl ether
3,5-dimethyl-4'-nitrodiphenyl ether
2,4'-dinitro-4-trifluoromethyldiphenyl ether

ANILIDES

N-(3,4-dichlorophenyl)propionamide
N-(3,4-dichlorophenyl)methacrylamide
N-(3-chloro-4-methylphenyl)-2-methylpentanamide
N-(3,4-dichlorophenyl)trimethylacetamide
N-(3,4-dichlorophenyl)-α,α-dimethylvaleramide

URACILS 5-bromo-3-s-butyl-6-methyluracil
5-bromo-3-cyclohexyl-1,6-dimethyluracil
3-cyclohexyl-5,6-trimethyleneuracil
5-bromo-3-isopropyl-6-methyluracil
3-tert-butyl-5-chloro-6-methyluracil

NITRILES 2,6-dichlorobenzonitrile
diphenylacetonitrile
3,5-dibromo-4-hydroxybenzonitrile
3,5-diiodo-4-hydroxybenzonitrile

OTHER ORGANIC HERBICIDES 2-chloro-N,N-diallylacetamide
N-(1,1-dimethyl-2-propynyl)-3,5-dichlorobenzamide
maleic hydrazide
3-amino-1,2,4-triazole
monosodium methanearsonate
disodium methanearsonate
N,N-dimethyl-α,α-diphenylacetamide
N,N-di-(n-propyl)2,6-dinitro-4-trifluoromethylaniline
N,N-di-(n-propyl)-2,6-dinitro-4-methylaniline
N,N-di-(n-propyl)-2,6-dinitro-4-methylsulfonylaniline
O-(2,4-dichlorophenyl)-O-methyl-isopropylphosphoramidothioate
4-amino-3,5,6-trichloropicolinic acid
2,3-dichloro-1,4-naphthoquinone
di(methoxythiocarbonyl)disulfide
6,7-dihyrodipyrido[1,2-a:2',1'-c]pyrazidinum salts
1,1'-dimethyl-4,4'-bipyridinium salts
3,4,5,6-tetrahydro-3,5-dimethyl-2-thio-2H-1,3,5-thiadiazine This invention provides new compounds which are useful for inhibiting or controlling undesirable plant growth in numerous environments.

We claim:
1. A compound of the formula

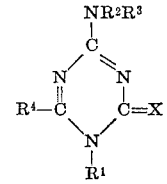

wherein $R^1$ is an alkyl group of 1 to 5 carbon atoms, $R^2$ is an alkyl group straight or branched of 2 to 14 carbon atoms, $R^3$ is hydrogen or is an alkyl group of 1 to 5 carbon atoms when $R^2$ is t-butyl or t-amyl, $R^4$ is hydrogen, methyl or ethyl, and X is O or S, and their acid addition salts.

2. A compound according to claim 1 wherein $R^3$ and $R^4$ are hydrogen.

3. A compound according to claim 2 wherein $R^1$ is methyl.

4. A compound according to claim 2 wherein $R^1$ is ethyl.

5. A compound according to claim 2 wherein $R^1$ is isopropyl.

6. A compound according to claim 2 wherein $R^2$ is tertiary butyl.

7. A compound according to claim 1 wherein $R^3$ is methyl.

8. A compound according to claim 1 wherein X is O.

9. A compound according to claim 6 which is 1-ethyl-4-t-butylamino-1,2-dihydro-1,3,5-triazin-2-one.

10. A compound according to claim 6 which is 1-ethyl-4-t-butylamino-1,2-dihydro-1,3,5-triazine-2-thione.

11. A compound according to claim 6 which is 1-isopropyl-4-t-butylamino-1,2-dihydro-1,3,5 - triazin - 2-one.

References Cited

UNITED STATES PATENTS 2,258,320 10/1941 Ericks _____ 260—249.5
3,129,699 4/1964 Millikan _____ 260—249.5X JOHN M. FORD, Primary Examiner U.S. Cl. X.R.

71—93; 260—248, 552, 553